United States Patent
Ito et al.

[11] 3,787,108
[45] Jan. 22, 1974

[54] DEVICE FOR ADJUSTING THE FOCAL POINT OF A PHOTOGRAPHIC LENS

[75] Inventors: Tadashi Ito; Kanehiro Sorimachi, both of Yokohama, Japan

[73] Assignee: Canon Kabushiki Kaisha, Tokyo, Japan

[22] Filed: Dec. 16, 1971

[21] Appl. No.: 208,610

[30] Foreign Application Priority Data
Dec. 23, 1970  Japan .............................. 45/129046

[52] U.S. Cl. ................... 350/252, 350/245, 350/257
[51] Int. Cl. ............................................. G02b 7/02
[58] Field of Search ........................... 350/245–257

[56] References Cited
UNITED STATES PATENTS

| | | | |
|---|---|---|---|
| 2,067,189 | 1/1937 | Howell | 350/257 |
| 2,461,357 | 2/1949 | Broido et al. | 350/257 |
| 2,017,823 | 10/1935 | Taylor | 350/257 |
| 2,732,776 | 1/1956 | Meixner | 350/255 |
| 2,383,439 | 8/1945 | Baer | 350/252 |

FOREIGN PATENTS OR APPLICATIONS
309,938    1929    Great Britain ..................... 350/257

Primary Examiner—David Schonberg
Assistant Examiner—Michael J. Tokar
Attorney, Agent, or Firm—William R. Woodward

[57] ABSTRACT

In a device for adjusting the focal point of a photographic lens which comprises a reception cylinder, a rotatable cylinder and a lens holding cylinder, the rotatable cylinder has an annular groove formed peripherally thereof and engageable with sloped surfaces formed on anti-slip members. The anti-slip members are adjustable to a position for smoothly rotating the rotatable cylinder within the reception cylinder.

1 Claim, 3 Drawing Figures

PATENTED JAN 22 1974  3,787,108

TADASHI ITO
KANEHIRO SORIMACHI
INVENTORS

BY *Wm R Woodward*
ATTORNEY

DEVICE FOR ADJUSTING THE FOCAL POINT OF A PHOTOGRAPHIC LENS

BACKGROUND OF THE INVENTION

1. Field of the Invention

This invention relates to a device for adjusting the focal point of a photographic lens, and more particularly to improvements in the rotatable cylinder holding mechanism in such a device which comprises a rotatable cylinder received in a reception cylinder secured to a camera and a lens holding cylinder screwed for axial movement in the rotatable cylinder.

2. Description of the Prior Art

In a photographic lens of the described type, the presence of any axial clearance between the reception cylinder and the rotatable cylinder may result in an unstable position of the lens with respect to the surface of a photographic film and accordingly in an error of focusing. Also, the absence of a proper clearance between the two cylinders may cause unsmoothness of the focusing operation.

Heretofore, in assembling a photographic lens of such construction, a washer has been employed to adjust the clearance between the rotatable cylinder and the reception cylinder so as to eliminate any axial clearance and permit smooth rotation of the rotatable ring. However, this has required much time and high cost.

SUMMARY OF THE INVENTION

It is a primary object of the present invention to provide a photographic lens of very much simplified construction which eliminates all the foregoing disadvantages existing in the prior art.

Such object may be achieved by providing a device for adjusting the focal point of a photographic lens which comprises a reception cylinder secured to a camera body, a rotatable cylinder received in the reception cylinder and rotatable with an operating ring but limited in axial movement, and a lens holding cylinder holding therein a lens system and screwed in the rotatable cylinder for linear axial movement. The rotatable cylinder has an annular groove formed peripherally thereof for receiving a pair of anti-slip members secured to the reception cylinder. The anti-slip members each have a surface portion sloped with respect to the optical axis of the lens system and engageable with the groove on the rotatable cylinder to thereby limit axial movement of the rotatable cylinder. Each of the anti-slip members is provided by a portion of a ring having an arcuate inner edge extending along the groove on the rotatable cylinder. Each of the anti-slip members has two parallel slots through which it is secured to the reception cylinder.

BRIEF DESCRIPTION OF THE DRAWINGS

Various embodiments of the present invention will be described in detail by reference to the accompanying drawings, in which.

DESCRIPTION OF THE PREFERRED EMBODIMENTS

Figure 1:
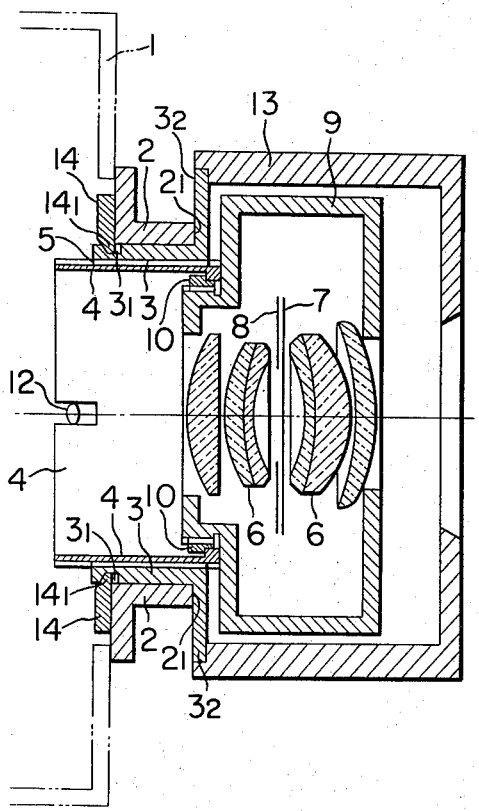
FIG. 1 is a longitudinal sectional view of a photographic lens assembly according to the present invention.
Figure 2:
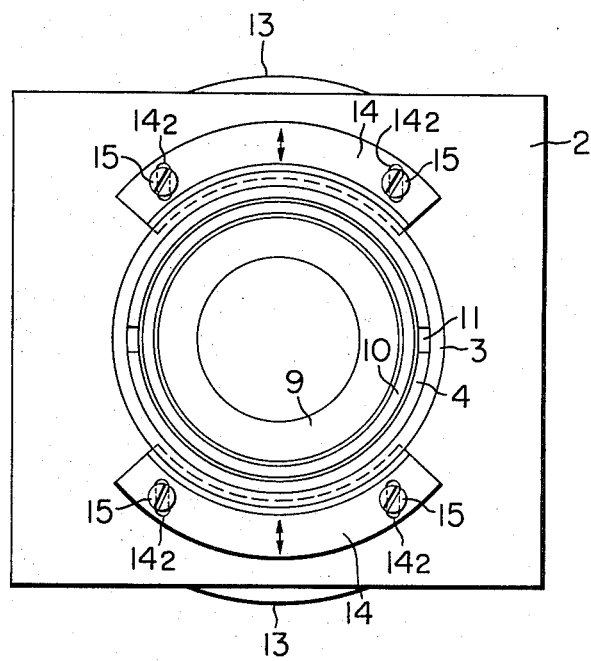
FIG. 2 is a rear end view of the photographic lens assembly.

Referring to FIGS. 1 and 2, a camera body 1 has a reception cylinder 2 integrally attached thereto and formed with a flanged portion $2_1$ for attaching the cylinder 2 to the camera body as by screws or other suitable means. An internally threaded cylinder 3 is rotatably received in the reception cylinder 2, and an externally threaded lens holding cylinder 4 is screwed into the internally threaded rotatable cylinder 3.

The lens holding cylinder 4 has a shutter casing 9 fixed to one end thereof by means of nuts 10. The shutter casing 9 houses therein a lens system 6, shutter blade 7 and a stop blade 8. The lens holding cylinder 4 is formed with a pair of guide grooves 11 for linear advance, each adapted to receive a pin 12 studded in a fixed portion of the camera body.

The rotatable cylinder 3 has an annular groove $3_1$ formed peripherally of the rear or left end portion thereof. A pair of anti-slip members 14 is attached to the rear or left end face of the reception cylinder 2 by means of screws 15 passing through adjust slots $14_2$ formed in the anti-slip members 14, so that one end $14_1$ of each member 14 is engaged with the annular groove $3_1$ to prevent the rotatable cylinder 3 from forwardly slipping out of the reception cylinder 2.

An operating ring 13 is secured to the flange $3_2$ of the rotatable cylinder 3. In the embodiment illustrated herein, this ring also serves as a protective cover for the shutter casing 9.

The rotatable cylinder 3 is rotatable with rotation of the operating ring 13 so that the lens holding cylinder 4 in threaded engagement with the cylinder 3 may be linearly guided with the aid of the guide grooves 11 and pins 12 to thereby accomplish a focusing operation through such axial movement without any accompanying rotational movement.

Figure 3:
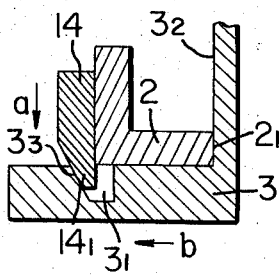
FIG. 3 is a enlarged, fragmentary sectional view showing various forms of the anti-slip mechanism.

The end $14_1$ of each anti-slip member 14 and the rear edge of the groove $31_1$ on the rotatable cylinder 3 are both shown as being sloped in the embodiment of FIGS. 1 and 3, but either the anti-slip members 14 or the groove $3_1$ may have such a sloped surface portion, as shown in FIGS. 4 and 5.

Attachment of the anti-slip members 14 to the reception cylinder 2 may be accomplished by first loosely fitting the former to the latter by means of screws 15 and then forcing the anti-slip members 14 in the direction toward the lens center as indicated by arrow a (FIGS. 3 to 5) so as to insert the end $14_1$ into the groove $3_1$. When the end $14_1$ of each anti-slip member 14 is engaged with the rear edge $3_3$ of the groove $3_1$, the sloped surface portion(s) formed in both or either of the members 14 groove $3_1$ permits the rotatable cylinder 3 to be forced in the direction as indicated by arrow b, thereby bringing the flange surface $3_2$ of the cylinder 3 into contact with the forward end face $2_1$ of the reception cylinder 2. When a position in which no axial clearance is present is reached, with smooth rotation of the rotatable cylinder 3 relative to the reception cylinder 2, the anti-slip members 14 may be tightly fastened by the screws 15 to complete the adjustment.

As will be appreciated from the foregoing description, the present invention provides a construction in which the clearance between the rotatable cylinder and the reception cylinder may be adjusted by the anti-slip members for the rotatable cylinder, and this leads to the provision of a camera which does not require so much time for assembly and adjustment as experienced with conventional cameras and which permits the forcusing operation to be achieved smoothly and readily without causing any error during the focusing.

We claim:

1. A device for adjusting the focal point of a photographic lens comprising:

a reception cylinder secured to a camera body;

a rotatable cylinder received in said reception cylinder and rotatable together with an operating ring but limited in axial movement, said rotatable cylinder having an annular groove which is formed peripherally thereof for receiving a pair of anti-slip members affixed to said reception cylinder and which has a side wall having conical surface, each of said anti-slip members being provided by a portion of a ring having an arcuate inner edge extending along said groove on said rotatably cylinder, and having a conical surface engageable with said conical surface of the rotatable cylinder and parallel slots through which each of said anti-slip members is secured to said reception cylinder in a position such as to provide a rotation bearing for said rotatable cylinder and to maintain a rotation-aiding clearance between said reception cylinder and said rotatable cylinder, while limiting axial movement of said rotatable cylinder;

and a lens holding cylinder holding therein a lens system and screwed in said rotatable cylinder for linear axial movement in response to the rotation of said rotatable cylinder.

* * * * *

UNITED STATES PATENT OFFICE
CERTIFICATE OF CORRECTION

Patent No. 3,787,108   Dated January 22, 1974

Inventor(s) Tadashi ITO and Kanehiro SORIMACHI

It is certified that error appears in the above-identified patent and that said Letters Patent are hereby corrected as shown below:

In Column 1, line 67, after "showing" delete "various forms of".

In Column 2, line 42-44, after "3" in line 43, insert a period (.) and delete ", but either the anti-slip members 14 or" and delete everything down to the end of line 45.

In Column 2, line 49, change "FIGS." to -- FIG. --;

In Column 2, line 50, after the first occurrence of "3", delete "to 5".

In Column 2, line 53, change "portion(s)" to -- portions -- and delete "or either of".

In Column 2, line 54, after "14" insert -- and --, and after the first occurrence of "3" change "permits" to -- cause --.

Signed and sealed this 14th day of January 1975.

(SEAL)
Attest:

McCOY M. GIBSON JR.
Attesting Officer

C. MARSHALL DANN
Commissioner of Patents